United States Patent
Mori et al.

(10) Patent No.: US 7,364,223 B2
(45) Date of Patent: Apr. 29, 2008

(54) CAB SUPPORTING STRUCTURE

(75) Inventors: Tadashi Mori, Hirakata (JP); Ryo Kondo, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 11/495,760

(22) Filed: Jul. 31, 2006

(65) Prior Publication Data

US 2006/0261640 A1 Nov. 23, 2006

Related U.S. Application Data

(62) Division of application No. 10/731,405, filed on Dec. 10, 2003.

(30) Foreign Application Priority Data

Dec. 11, 2002 (JP) ............................. 2002-358852

(51) Int. Cl.
*B62D 33/10* (2006.01)

(52) U.S. Cl. ............................. 296/190.07; 296/35.1; 180/89.13; 267/140

(58) Field of Classification Search .......... 296/190.01, 296/190.03, 190.07, 35.1, 35.2; 180/89.13, 180/89.1; 267/130, 140, 152, 153, 293; 190/89.13
See application file for complete search history.

(56) References Cited

U.S. PATENT DOCUMENTS

| 3,868,190 | A | 2/1975 | Moore ........................ 403/189 |
| 4,135,757 | A | 1/1979 | Smith et al. .............. 296/35 R |
| 4,149,608 | A | 4/1979 | Hennessey ............... 180/89.14 |
| 4,210,362 | A | 7/1980 | Boersma ..................... 296/164 |
| 4,438,970 | A | 3/1984 | Boucher ..................... 296/190 |
| 4,515,234 | A | 5/1985 | Loy et al. ................. 180/89.12 |
| 5,209,316 | A | 5/1993 | Bauer ....................... 180/89.14 |
| 5,388,884 | A | 2/1995 | Keehner et al. ............ 296/190 |
| 5,579,860 | A | 12/1996 | Halverson et al. ....... 180/89.14 |
| 6,013,880 | A | 1/2000 | McFarlane et al. ........ 177/139 |
| 6,206,121 | B1 | 3/2001 | Michel ..................... 180/89.13 |
| 6,478,102 | B1 | 11/2002 | Puterbaugh et al. ..... 180/89.12 |
| 6,598,932 | B2 | 7/2003 | Gross et al. ........... 296/190.07 |
| 6,805,215 | B2 | 10/2004 | Puterbaugh .............. 180/89.13 |

(Continued)

FOREIGN PATENT DOCUMENTS

| EP | 1 384 657 | 1/2004 |
| FR | 2 333 674 | 7/1977 |
| JP | 10/26172 | 1/1998 |
| JP | 10-204924 | 8/1998 |
| JP | 11/100865 | 4/1999 |

(Continued)

*Primary Examiner*—Dennis H. Pedder
(74) *Attorney, Agent, or Firm*—Kratz, Quintos & Hanson, LLP

(57) ABSTRACT

To provide a cab supporting structure capable of supplying a protection function with a simple configuration by using an attenuation mechanism commonly used for a controlled vehicle for protecting the cab or an operator from high impact force acting on the cab while absorbing vibration and shock on the cab in a normal condition when a construction machine falls down. The cab supporting structure is provided with an attenuation mechanism elastically supporting a cab against a frame. A regulation member, only when certain displacement is generated in the cabin the extension direction of the attenuation mechanism, regulating this displacement is provided separately from this attenuation mechanism. The regulation member regulates the displacement of the cab before a stroke end of the attenuation mechanism. Upon arranging a work equipment on the frame, the regulation member is provided at least at the opposite side of the work equipment.

5 Claims, 20 Drawing Sheets

| U.S. PATENT DOCUMENTS | | | | FOREIGN PATENT DOCUMENTS | | |
|---|---|---|---|---|---|---|
| 7,029,059 B2 | 4/2006 | Bernhardt et al. ..... 296/190.07 | JP | 11-310167 | 11/1999 |
| 2003/0111281 A1 | 6/2003 | Jo et al. ................... 180/89.13 | JP | 2001-39352 | 2/2001 |
| 2006/0071499 A1 | 4/2006 | Yoon .......................... 296/35.1 | JP | 2001-193103 | 7/2001 |

(a)

(b)

CAB SUPPORTING STRUCTURE

CROSS REFERENCE TO RELATED APPLICATIONS

This application is a divisional application of U.S. Ser. No. 10/731,405, filed on Dec. 10, 2003.

BACKGROUND OF THE INVENTION

1. Field of the Invention

The present invention relates to a cab supporting structure of a work vehicle such as a construction machine, and particularly relates to a cab supporting structure capable of ensuring safeness even when a high impact force acts on the cab.

2. Description of the Related Art

Generally, as shown in FIG. 17, a hydraulic shovel as the construction machine is provided with a lower driving body 81 and an upper swing body 82 that is swingably attached to this lower driving body 81 via a swing mechanism. Then, a cab (cabin) 83 is attached to this upper swing body 82 and at this cab's 83 side, a work equipment 84 is projected from the upper swing body 82.

In order to absorb shock to the cab 83 while the vehicle is driving and to improve a ride quality, conventionally, the cab 83 is supported by a vehicle body frame via an attenuation mechanism. As this attenuation mechanism to absorb the shock, an antivibration member made of an elastic body may be used (for example, refer to patent documents 1, 2, 3 and 4).

As shown in FIG. 18, the conventional cab supporting structure disclosed in the patent document 1 is provided with an antivibration member 86 to be attached to the cabin's (cab's) 83 side, a positioning member 87 to be attached to this antivibration member 86, and an acceptance member 89 to be attached to a frame 88's side. In other words, the positioning member 87 is attached to the antivibration member 86 via a bolt member at its upper wall 87a, and a through-bore 90 is provided on its lower wall 87b. The acceptance member 89 has a projection 91, and this projection 91 is attached to the lower wall 87b via the bolt member with this projection 91 fitted in the through-bore 90 of the lower wall 87b. Thereby, the cab 83 is accepted by the frame 88 via the antivibration member 86 so as to absorb the vibration from the frame 88's side.

As shown in FIG. 19, the conventional cab supporting structure disclosed in the patent document 2 is provided with a lower side member 93, an upper side member 94, and a coupling member 95 (composed of a bolt member 103 and a nut member 107) to couple this lower member 93 with the upper side member 94. In other words, the lower side member 93 has a base 96 and a column portion 97 that is constructed from this base 96. On this base 96, an elastic body 98 is mounted. On the column portion 97, a long hole 99 that is elongated vertically is provided, and in this long hole 99, an elliptic ring-type elastic body 100 is fitted. Then, the upper side member 94 has a base 101 and a main portion 102 constructed from this base 101, and the main portion 102 is provided with a through-bore 104 into which a bolt member 103 of the coupling member 95 is inserted. In this case, the lower opening of the column portion 105 at the cab's 83 side is fitted into the main portion 102 of the upper side member 94, the bolt member 103 is inserted into through-bores 106 of this column 105, a through-bore 104 of the main portion 102, and the elastic body 100 of the lower side member 93 so as to engage a nut member 107 into this bolt member 103 by a screw. Therefore, the upper side member 94 is accepted by the elastic body 98 of the lower side member 93 and the bolt member 103 is inserted into the elastic body 100, and thereby, these elastic bodies 98 and 100 are made antivibration members, and the lower side member 93 can elastically accept the upper side member 94 so as to absorb the shock.

As shown in FIG. 20, the conventional cab supporting structure disclosed in the patent document 3 is provided with a pair of elastic bodies 111 to be arranged at the frame 88's side, and a pair of acceptance bodies 112 and 113 clipping these elastic bodies 111. In other words, a through-bore 114 is provided through the frame 88, the elastic bodies 111 are partially fitted into this through-bore 114, and a bolt member 115 to be inserted into these acceptance bodies 112 and 113 is engaged into the cab 83's side by a screw with the elastic bodies 111 clipped by the acceptance bodies 112 and 113. Thereby, the cab 83 may be elastically accepted by the frame 88. When the cab 82 is shifted (moved) to the frame's 88 side, a flange portion 116 of the acceptance body 113 may contact the frame 88 so as to regulate the further shift of this cab 83 toward the frame 88's side.

As shown in FIG. 21, the conventional cab supporting structure disclosed in the patent document 4 is provided with a case 120, a stud 121 to be received in this case 120, and an attenuation plate 122 to be received in the case 120 as coupled with this stud 121. In other words, the case 120 is composed of a tubular body 123 opening vertically, and a container 124 arranged at the lower side of this tubular body 123 and forming a reception chamber of the attenuation plate 122. An elastic body 125 to be fitted into the tubular body 123 of the case 120 is externally fitted to the stud 121 and viscosity liquid 126 is injected into the container 124. Then, a screw portion 127 projected from a stud 121 is fitted into the cab side by the screw and the case 120 is attached to the frame side. A stopper 128 is projected at the upper end of the tubular body 123 of the case 120, and at the same time, a stopper 129 is constructed on this stopper 128. A stopper 130 outwardly extending in the a radial direction is provided at the lower side of the tubular body 123.

In this attenuation mechanism shown in FIG. 21, when the stud 121 vibrates against the case 120, the viscosity liquid 126 is disarranged by this vibration, and due to the viscosity resistance of this viscosity liquid 126 and the attenuation plate 122, the absorption function may be effected so as to attenuate the vibration. When the stud 121 tilts toward the case 120, the cab side may abut against the stopper 129 and at the same time, the attenuation plate 122 may abut against the stopper 130 so as to prevent the cab side from further tilting of the cab side.

[Patent Document 1]
JP-A-2001-39352 (pages 2-3, FIG. 2)
[Patent Document 2]
U.S. Pat. No. 3,868,190 (third to fourth column, FIG. 2)
[Patent Document 3]
JP-A-11-310167 (pages 32-34, FIG. 2)
[Patent Document 4]
JP-A-10-26172 (page 3, FIG. 1, FIG. 3)

Even if the construction machine falls down, or the construction machine crashes into a rock and a tree or the like, the high impact force may act on the cab 83. Therefore, in order to secure an operator from such impact force, recently, a cab corresponding to a ROPS (Roll Over Protective Structure) having a protection function has been used. An availability of the above-described each conventional example has been examined with respect to the case that the above-described high impact force (hereinafter, refereed to as a ROPS load) acts on the cab 83. At first, according to the conventional cab supporting structure disclosed in the patent document 1 shown in FIG. 18, if the impact force acts in a direction separating the cab side from the frame 88, there is no regulation means for the shift of the cab 83 and the cab 83 is highly displaced, so that the conventional cab supporting structure disclosed in the patent document 1 cannot be provided for the ROPS. According to the conventional cab supporting structure disclosed in the patent document 2 shown in FIG. 19, if the cab's 83 side is displaced in a direction separating the cab's 83 side from the frame's 88 side, the bolt member 103 of a coupling body 25 may abut against the elastic body 100 of the lower side member 93 against this displacement, and this displacement can be regulated, however, if the ROPS load acts in the direction separating the upper side member 94 from the lower side member 93, this load can barely supported and it is feared that the elastic body 100 may be damaged. Therefore, the conventional cab supporting structure disclosed in the patent document 2 cannot be provided for the latter case.

Next, according to the conventional cab supporting structure disclosed in the patent document 3 shown in FIG. 20, with respect to the displacement in the direction approaching the frame's 88 side of the cab's 83 side, the flange portion 116 of the acceptance body 113 may contact the frame 88 so as to regulate the further displacement of this cab 83 toward the frame's 88 side. However, on the contrary, if the ROPS load acts in the direction separating the cab side from the frame's 88 side, this load is allowed to be supported, however, the lower elastic body 111 is compressed by the frame 88 and the acceptance body 112 and it is feared that the elastic body 111 and the acceptance body 112 are damaged. Therefore, the conventional cab supporting structure disclosed in the patent document 3 cannot be provided for the latter case.

According to the conventional cab supporting structure disclosed in the patent document 4 shown in FIG. 21, with respect to the displacement in the direction approaching the cab side to the frame side, the cab side may abut against the stopper 129 so as to regulate the further displacement of this cab toward the frame's 88 side. With respect to the displacement in the direction separating the cab side from the frame side, the attenuation plate 122 may abut against the stopper 130 so as to regulate the further displacement of this cab in the direction separating from the frame's 88 side. The conventional cab supporting structure shown in FIG. 21 is preferably used for the cab corresponding to the ROPS. However, since the regulation means (stopper) is provided in this attenuation mechanism (liquid sealed type mounting) itself in this case, the configuration of this attenuation mechanism becomes complex and the attenuation mechanism should be larger and heavier and it becomes too expensive. Accordingly, the cab corresponding to the ROPS using such a special attenuation mechanism should be also expensive.

SUMMARY OF THE INVENTION

The present invention has been made taking the foregoing problems into consideration and an object of which is to provide a cab supporting structure capable of supplying a protection function with a simple configuration by using an attenuation mechanism commonly used for a controlled vehicle for protecting the cab or an operator from high impact force acting on the cab while absorbing vibration and shock on the cab in a normal condition when a construction machine falls down or the construction machine crashed into a rock or a tree or the like.

Therefore, the cab supporting structure according to claim 1 may support a cab 2 against a frame 1 via an attenuation mechanism 25, wherein a regulation member 26, only when certain displacement is generated in the cab 2 in the extension direction of the attenuation mechanism 25, regulating this displacement is provided separately from this attenuation mechanism 25.

According to the cab supporting structure according to claim 1, since the attenuation mechanism 25 may support the cab 2 against the frame 1, it is possible to absorb the vibration and shock acting on the cab 2 in a normal condition. When the construction machine falls down, or the rock and the tree or the like crushes into the construction machine, if the high impact force acts on the cab 2 and certain displacement occurs, the regulation member 26 may regulate this displacement so as to improve a cab rigidity and to prevent the accidents such as cab damage. Then, according to this cab supporting structure, since the regulation member 26 is provided separately from the attenuation mechanism 25, the attenuation mechanism 25 commonly used in a control vehicle and the like may be used as it is and the regulation member 26 may be newly added. Therefore, there is no need to use a special expensive attenuation mechanism in order to improve the cap rigidity and for example, a ROPS specified vehicle can be provided at a low cost.

According to the cab supporting structure of claim 2, the regulation member 26 has a cab side member attached to the cab's 2 side, and this cab side member is in a non-interferential relation with the frame's 1 side in a normal condition.

According to the cab supporting structure of claim 2, since a cab side member thereof is in an incoherent relation with the above-described frame's 1 side, in this normal condition, the attenuation mechanism 25 becomes in the incoherent relation with the regulation member 26. Therefore, in the normal driving and normal operation of the construction machine such as a hydraulic shovel using this cab supporting structure, the regulation member 26 has no influence on the operational condition of the attenuation mechanism 25, so that, for example, as same as the controlled vehicle, the attenuation mechanism 25 can absorb the vibration and shock on the cab 2 and a ride quality is not made poor.

According to the cab supporting structure of claim 3, the regulation member 26 regulates displacement of the cab 2 before a stroke end of the attenuation mechanism 25.

According to the cab supporting structure of claim 3, since the displacement of the cab 2 is regulated by the regulation member 26 before a stroke end of the attenuation mechanism 25, it is possible to certainly avoid the damage of the attenuation mechanism 25 and to improve endurance of the attenuation mechanism 25. In other words, since the excess load damaging the attenuation mechanism 25 such as the ROPS load does not act on the attenuation mechanism 25, the endurance as the cab supporting structure is made excellent and the cab 2 having a good ride quality for a long time can be obtained.

According to the cab supporting structure of claim 4, the regulation member 26 is arranged between a column 10 of the cab 2 and the frame 1.

According to the cab supporting structure of claim 3, since the regulation member 26 is arranged between a column 10 of the cab 2 and the frame 1, the support rigidity of the cab 2 due to the regulation member 26 is allowed to be improved. Thereby, when the excess load such as the ROPS load acts on the structure, it is possible to prevent the accident such as the cab damage more certainly.

According to the cab supporting structure of claim 5, the regulation member is provided at least at the opposite side of a work equipment when the work equipment is arranged on the frame 1.

When the work equipment is disposed on the frame 1 as the above-described cab supporting structure in claim 5, the work equipment functions as a guard, and this decreases the opportunities that the excess load such as the ROPS load may act on the cab 2 from the work equipment side. On the contrary, there are more opportunities that the excess load such as the ROPS load may act at the opposite side of the work equipment than the above-described opportunities. Therefore, if the regulation member 26 is provided at the opposite side of the work equipment, its function may be effectively exerted. If the regulation member 26 at the work equipment side is omitted, it is possible to reduce the manufacturing cost of the structure.

According to the cab supporting structure of claim 6, when rigidity of the cab 2 is set to be larger at the rear side than at the front side, the regulation member 26 is provided at least at the rear side of the cab.

According to the cab supporting structure of claim 6, the rigidity of the above-described cab 2 is set to be higher at the rear side than at the front side. That is why the column at the front side of the cab should be narrow in order to secure eyesight and the column should be thicker at the rear side so as to increase its rigidity. On the other hand, since the operator can monitor the front side, he or she can avoid the operation of the excess load of the ROPS load at the front side to some extent, however, he or she can hardly monitor the rear side and there are many possibilities that the excess load such as the ROPS load may act at the rear side. Accordingly, if the regulation member 26 is provided at the rear side of the cab, its function can be effectively exerted. If the regulation member 26 at the rear side of the cab is omitted, it is possible to reduce the manufacturing cost of the structure. If the column is made thicker to increase the rigidity, this involves an advantage that the attachment operation of the regulation member 26 at the rear side of the cab becomes easier.

BRIEF DESCRIPTION OF THE DRAWINGS

FIG. 16(a) is a sectional view thereof and FIG. 16(b) is a sectional view in the case of using the other attenuation mechanism;

DESCRIPTION OF THE PREFERRED EMBODIMENTS

Figure 1:
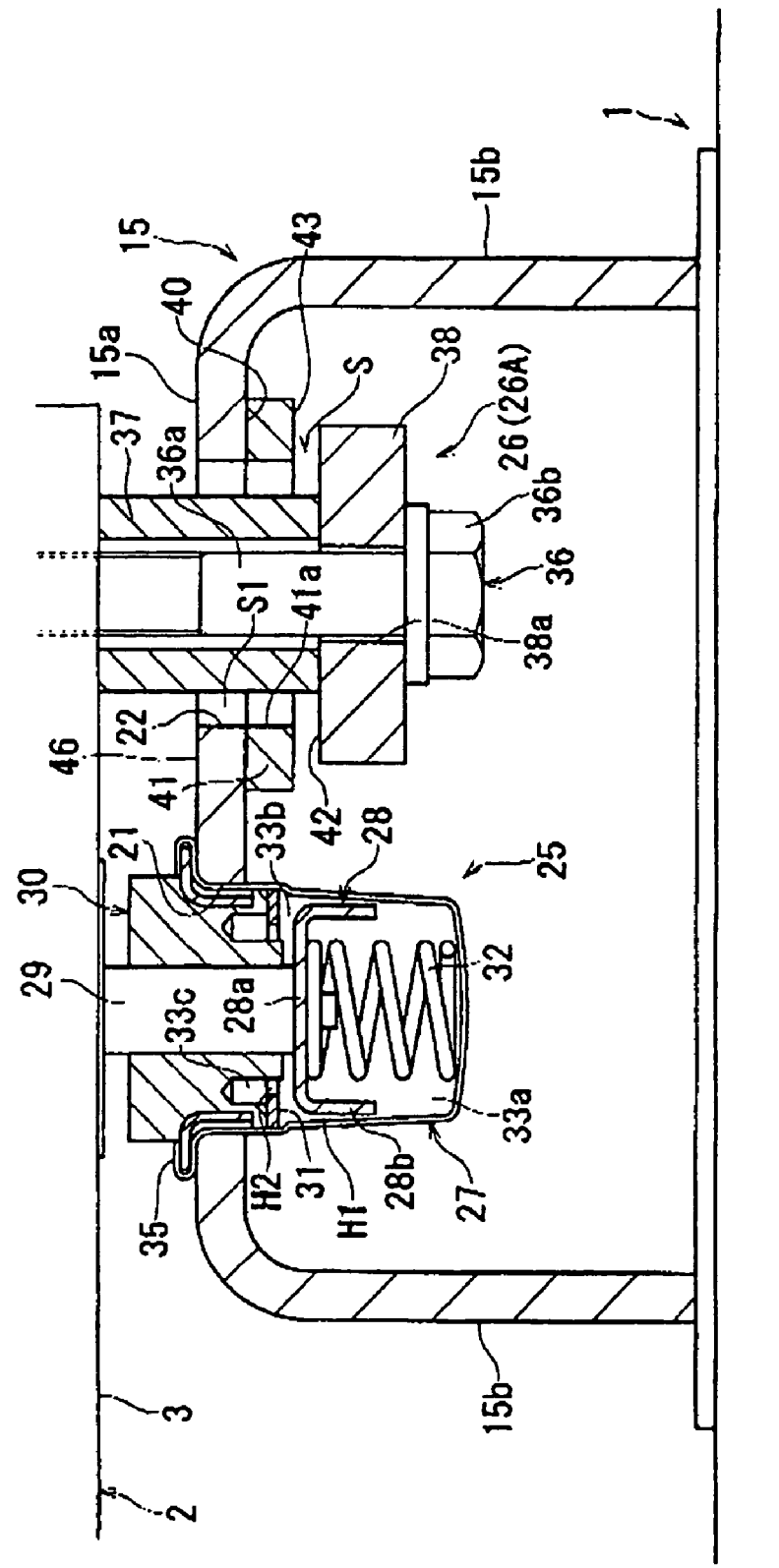
FIG. 1 is an enlarged sectional view of a cab supporting structure according to the present invention.

With reference to the drawings, the embodiments according to the cab supporting structure of the present invention will be described in detail below. FIG. 1 is an enlarged sectional view of the present cab supporting structure. This cab supporting structure is used for a construction machine such as a hydraulic shovel and it may support a cab (operator's cab) 2 with spaced from a frame 1 of an upper swing mechanism.

Figure 2:
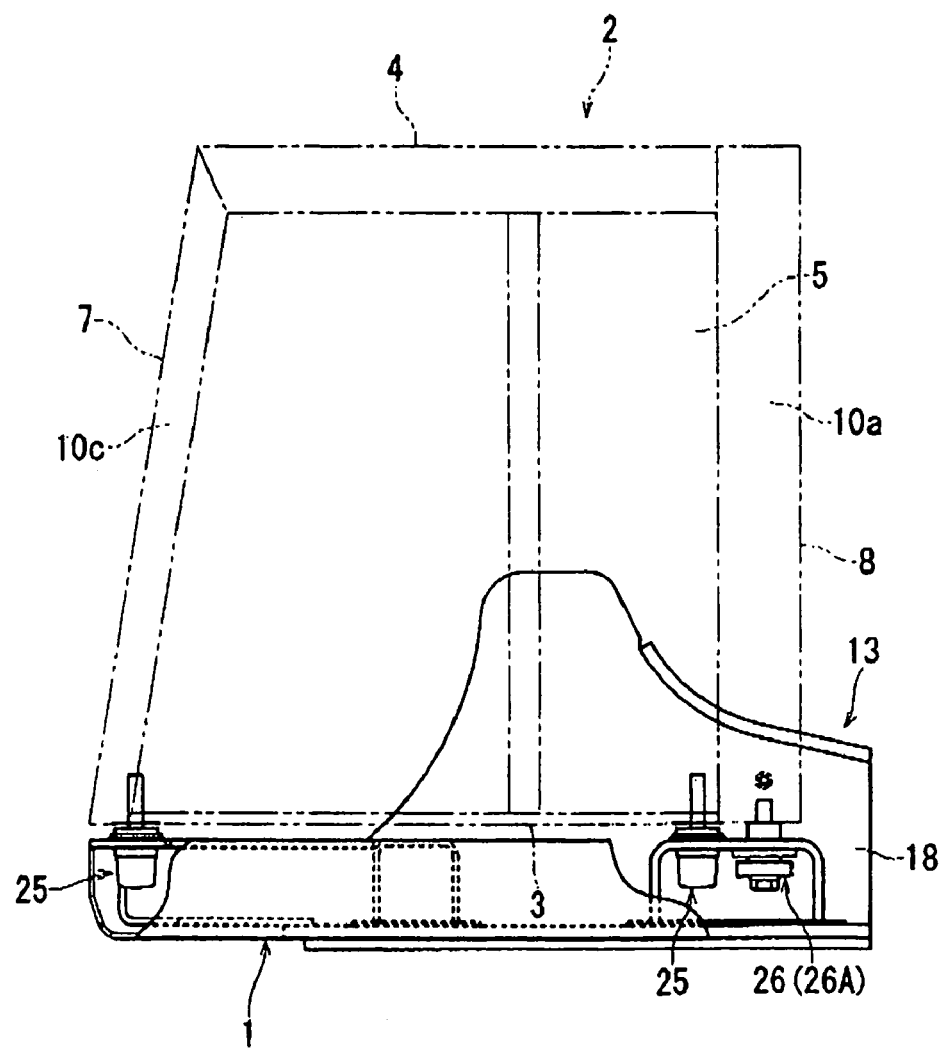
FIG. 2 is a side view of a frame of a construction machine to be supported by the above-described cab supporting structure.
Figure 3:
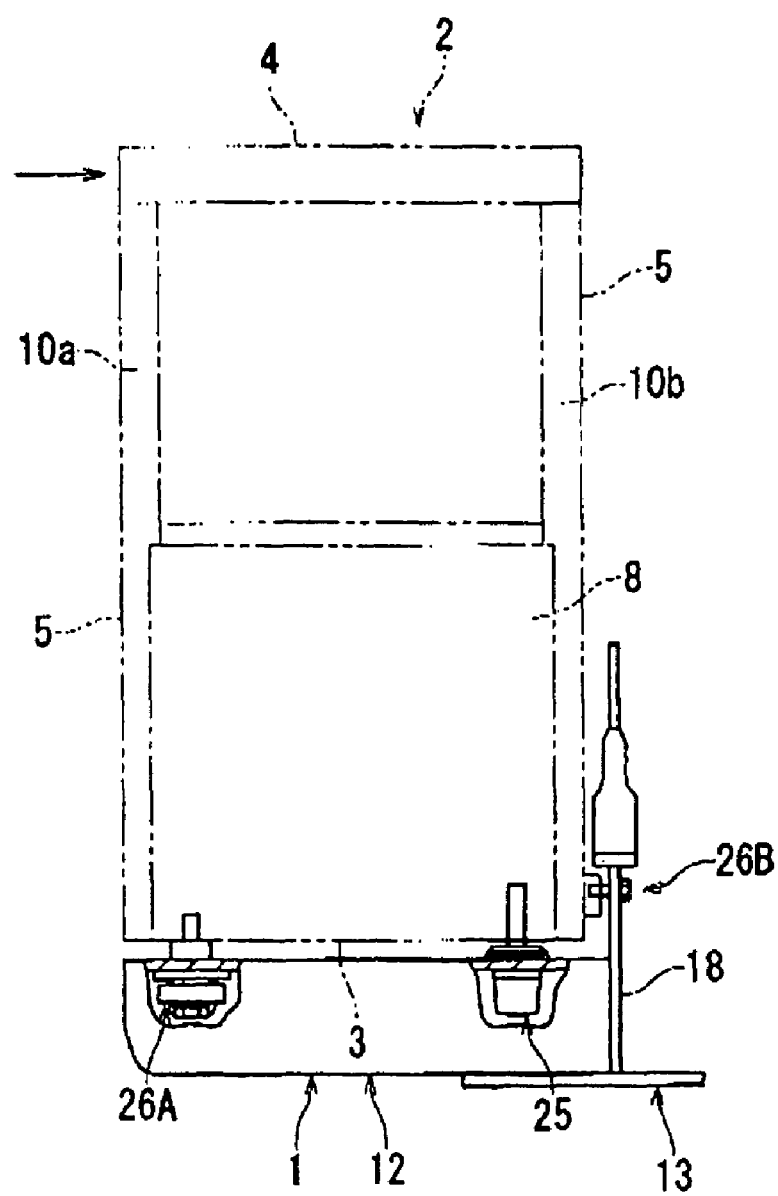
FIG. 3 is a rear view of the frame of the construction machine to be supported by the above-described cab support structure.
Figure 4:
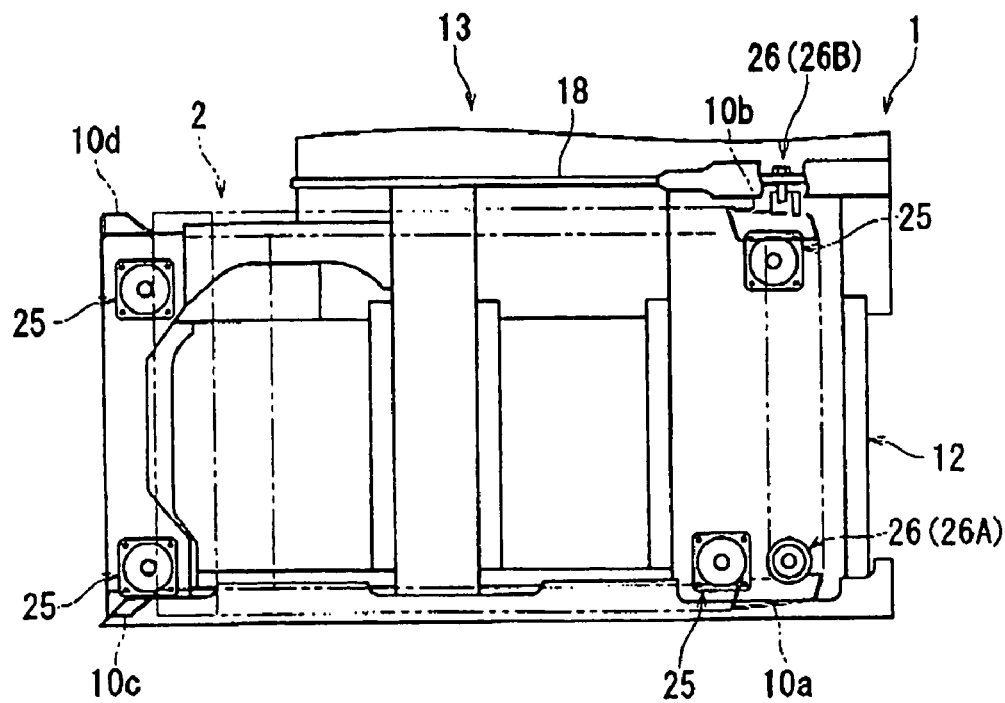
FIG. 4 is a plan view of the frame of the construction machine to be supported by the above-described cab support structure.

The cab 2 is used as a ROPS corresponding cab by constructing columns 10a, 10b, 10c, and 10d from four corners of a floor flame 3 as shown from FIG. 2 to FIG. 4. Then, a ceiling wall 4 is disposed at a ceiling side, side face panels 5 are disposed at a side face side, a front panel 7 is disposed at a front face side, and a rear face panel 8 is disposed at a rear face side. In this case, columns 10a and 10b at a rear side are larger (thicker) than columns 10c and 10d at a front side. In other words, as shown in FIG. 4, the lateral directional measurements of the columns 10a and 10b at the rear side are set to be larger than the lateral directional measurements of the columns 10c and 10d at the front side and the vertical measurements (thickness measurements) of the columns 10a and 10b at the rear side are set to be larger than the thickness measurements of the columns 10c and 10d at the front side. That is why the columns 10c and 10d at the front side are made narrower so as to secure eyesight since window portions are provided to a front panel 7 and side panels 5. Thereby, in this cab 2, its rigidity is set to be larger at the rear side than at the front side.

Figure 5:
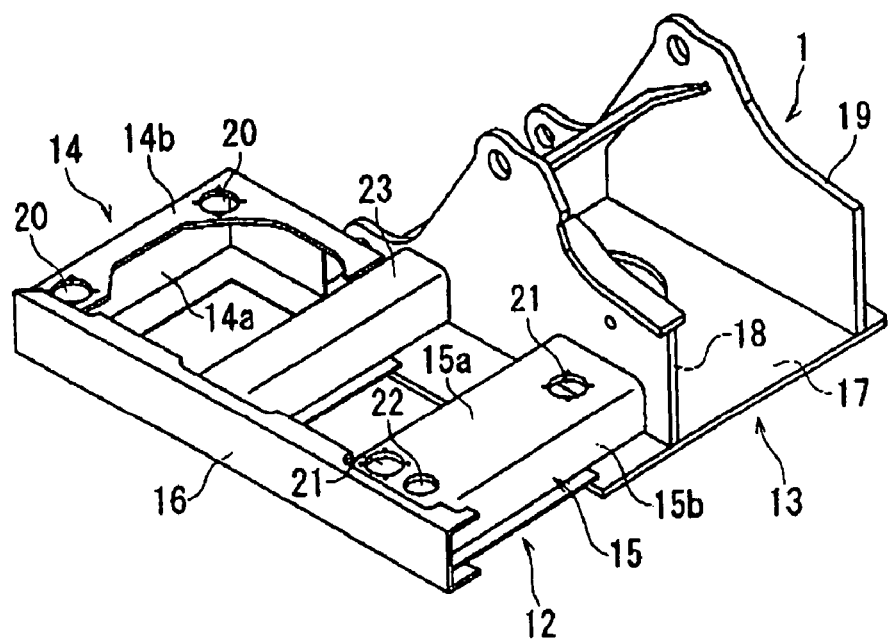
FIG. 5 is a perspective view of the frame of the construction machine to be supported by the above-described cab support structure.

As shown in FIG. 5, the frame 1 of the upper swing mechanism has a cab corresponding part 12, through of which cab supporting structure the above-described cab 2 is supported, and a work equipment supporting part 13, to which a work equipment its illustration is omitted) to be annexed to the upper swing mechanism. The cab corresponding part 12 is provided with a front support frame 14, a rear support frame 15, and a side frame 16 coupling the front support frame 14 with the rear support frame 15, and the work equipment supporting part 13 is provided with a base 17 and a pair of rising walls 18 and 19 constructed from this base 17.

The front support frame 14 has a front face wall part 14a and an upper face wall part 14b, and on its upper wall part 14b, through-bores 20 having an attenuation mechanism 25 fitted thereto to be described later (refer to FIG. 1) are provided. An end at the work equipment supporting part's 13 side is fixed on the base 17, and the end of the opposite side of the work equipment is fixed to the side frame 16. The rear support frame 15 is composed of an upper wall 15a and leg parts 15b dropping from the front end edge and the rear end edge of this upper wall 15a, and as same as the front support frame 14, the end at the work equipment support part's 13 side is fixed on the base 17, and the end of the opposite side of the work equipment is fixed to the side frame 16. Then, on the upper wall 15a of this rear support frame 15, through-bores 21 having the attenuation mechanism 25 fitted thereto and a regulation member 26 to be described later (refer to FIG. 1) are provided. In this cab corresponding part 12, an intermediate frame body 23 is arranged between the front support frame 14 and the rear support frame 15.

Next, the cab support structure is provided with the attenuation mechanism 25 elastically supporting the cab 2 against the frame 1, and the regulation member 26, only when certain displacement is generated in the cab 2 in the extension direction of the attenuation mechanism 25, regulating this displacement, and as described above, the cab support structure may support the cab 2 with spaced from the frame 1.

As shown in FIG. 1, the attenuation mechanism 25 is provided with a case 27, a first attenuation plate 28 to be contained in this case 27, and a stud 29 supporting this first attenuation plate 28. The first attenuation plate 28 is composed of an upper wall 28a and a dropping wall 28b, and the upper wall 28a is coupled with the lower end of the stud 29 by a bolt. Then, an elastic body 30 is externally fitted to the stud 29, and the lower face of this elastic body 30 is accepted by a second attenuation plate 31 within the case 27. On the lower face of the elastic body 30, a concave portion is formed on the lower face of the elastic body 30. These elements may separate the inside of the case 27 into an A chamber 33a, a B chamber 33b, and a C chamber 33c. A coil spring 32 is arranged between the upper wall 28a of the first attenuation plate 28 and the bottom wall of the case 27, and the viscosity liquid such as silicon oil is sealed between the chamber 33a, the B chamber 33b, and the C chamber 33c. In this case, the chamber 33a and the B chamber 33b are communicated through a gap H1 between the dripping wall 28b of the first attenuation plate 28 and the inside of the case 27, and the B chamber 33b and the C chamber 33c are communicated through a gap H2 that is provided at the inner circumference side of the second attenuation plate 31.

Then, in this attenuation mechanism 25, an external stopper portion 35 is formed at the upper opening of the case 27. In the attenuation mechanism 25 to be mounted to the front support 14, this external stopper portion 35 is engaged on the upper face of the upper face wall part 14b with fitted into the through-bore 20 of the upper face wall part 14b. Then, under this condition, the external stopper portion 35 is fastened on the upper face wall part 14b through a bolt member (not illustrated). In the attenuation mechanism 25 to be mounted on the rear support frame 15, this external stopper portion 35 is fastened on the upper wall 15a with fitted into the through-bore 21 of the upper wall 15a. Then, under this condition, the external stopper portion 35 is fastened on the upper wall 15a through the bolt member (not illustrated). In the stud 29, a spring shaft portion (not illustrated) is provided at the upper end thereof, and through this spring shaft portion, the stud 29 is fastened on a floor frame 3 of the cab 2.

Thus, the cab 2 is supported by the frame 1 through the attenuation mechanism 25 at the four corners of the rear face of the bottom frame 3, and the shock from the frame's 1 side is allowed to be absorbed. In other words, when the cab 2 is displaced in a direction separating from the cab 2, the stud 29 is pulled upward, the viscosity liquid may flow into the A chamber 33a from the B chamber 33b through the gap H1, and then it may flow into the B chamber 33b from the C chamber 33c through the gap H2. Due to resistance in this time, the attenuation of the vibration can be obtained. When the large load acts in a vertical direction, the second attenuation plate 31 may accept the first attenuation plate 28 and may absorb the shock by bending the elastic body 30.

When the cab 2 is displaced in a direction approaching the frame 1, the stud 29 is pushed downward, the viscosity liquid flows from into the B chamber 33b from the A chamber 33a through the gap H1, and then, it may flow into the C chamber 33c from the B chamber 33b through the gap H2. Due to resistance in this time, the attenuation of the vibration can be obtained. When the large load acts in a lower direction, the lower face of the floor frame 3 abuts against the upper face of the elastic body 30 and may absorb the shock by bending the elastic body 30. In this case, the coil spring 32 can elastically accept the second attenuation plate 31 so as to absorb the shock.

However, when the construction machine falls down or the construction machine crashed into the rock or the tree or the like, the high impact may act on the cab 2. Therefore, this cab supporting structure is provided with the above-described regulation member 26 acting as the protection function to protect the cab 2 and the operator from this impact. Then, according to the present embodiment, only two pieces of the regulation member 26 are arranged at the rear side of the cab. The regulation member 26 at the opposite side of the work equipment is different from the regulation member 26 at the work equipment side in their configurations.

As shown in FIG. 1, the regulation member 26 at the opposite side of the work equipment (in this case, referred to as a first regulation member 26A) is provided with a shaft member 36, a tubular spacer 37 to be externally fitted into this shaft member 36, and a stopper 38 to be arranged downward of the tubular spacer 37, through which the shaft member 36 is inserted. The shaft member 36 is configured by a bolt member composed of a shaft portion 36a and a head portion 36b, and the shaft portion 36a is fastened on the floor frame 3 of the cab 2. In this case, the tubular spacer 37 may be freely fitted into the through-bore 22 of the upper wall 15a. Then, between the tubular spacer 37 and the head portion 36b of the shaft member 36, the stopper 38 lies.

In other words, the outer diameter of the tubular spacer 37 is set to be smaller than the inner diameter of the through-bore 22 of the upper wall 15a, and the inner diameter of the tubular spacer 37 is set to be larger than the outer diameter of the shaft portion 36a of the shaft member 36. The stopper 38 is composed of a circular plate having a center hole 38a, and the diameter of the center hole 38a is set to be slightly larger than the outer diameter of the shaft portion 36a of the shaft member 36.

An acceptance plate 41 is annexed to a rear face (lower face) 40 of the upper wall 15a. This acceptance plate 41 is made of a ring body. Then, bringing an axis center of its center hole 41a into line with the axis center of the through-bore 22, the hole diameter of the center hole 41a is set to be substantially identical with the hole diameter of the through-bore 22. In this case, the outer diameter of the above-described stopper 38 is set to be larger than that of the center hole 41a and to be smaller than that of the acceptance plate 41.

Then, the cab 2 is accepted by the above-described four attenuation mechanisms 25, and under the condition that the vibration and the shock are not generated from the frame 1, a gap S is formed between an upper face 42 of the stopper 38 and a lower face 43 of the acceptance plate 41, and a gap S1 is formed between the outer circumferential face of the tubular spacer 37 and the inner circumferential face of the through-bore 22, and between the outer circumferential face of the tubular spacer 37 and the inner circumferential face of the center hole 41a of the acceptance plate 41.

Accordingly, when the cab 2 is displaced in a direction separating from the frame 1, this first regulation member 26A may allow the displacement till the upper face 42 of the stopper 38 abuts against the lower face 43 of the acceptance plate 41. If the cab 2 is displaced in a direction approaching the frame 1, this first regulation member 26A may allow the displacement till the lower face of the bottom frame 3 abuts against the upper face 46 of the upper wall 15a. If the cab 2 is displaced in a horizontal direction of the frame 1, this first regulation member 26A may allow the displacement till the outer circumferential face of the spacer 37 abuts against the inner circumferential face of the through-bore 22. Therefore, the measurements of the above-described gaps S and S1 are set so that the cab side member to be attached to the cab 2's side (the tubular spacer 37, the stopper 38, and the shaft member 36 or the like) is in a non-interferential relation with the frame's 1 side in the normal condition. Thereby, in the normal driving and normal operation of the construction machine, this first regulation member 26A may not interfere the absorption function to absorb the shock due to the attenuation mechanism 25.

In this case, when the cab 2 is displaced in the direction separating from the frame 1, the first regulation member 26A may regulate the displacement so that it does not exceed a stroke end (a threshold of the elastic body 30 and the coil spring 32) in the extensional direction of the attenuation mechanism 25. In other words, just before the displacement exceeds the stroke end of the attenuation mechanism 25, the above-described gap S is set so as to abut the stopper 38 against the acceptance plate 41, and within the range not exceeding the stroke end of the attenuation mechanism 25, this first regulation member 26A may not interfere the absorption function to absorb the shock due to the attenuation mechanism 25.

Figure 6:
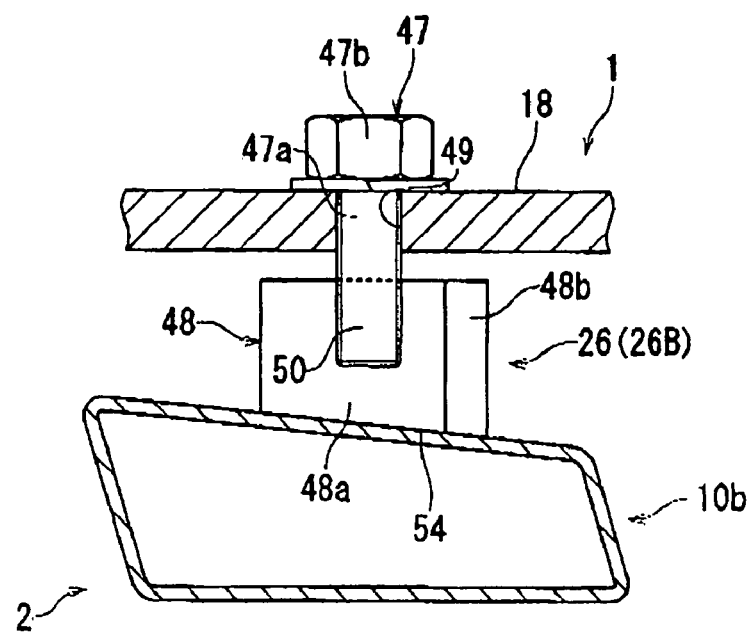
FIG. 6 is a plan view of a regulation member at a work equipment side of the above-described cab support structure.
Figure 7:
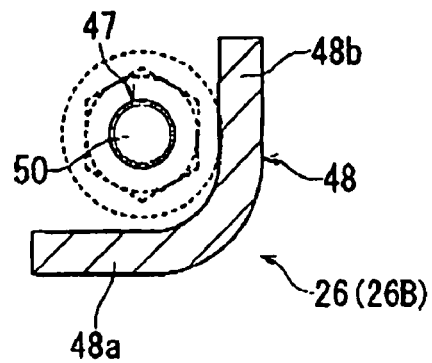
FIG. 7 is a sectional view of the regulation member at a work equipment side of the above-described cab support structure.

Next, as shown in FIG. 6 and FIG. 7, the regulation member 26 at the work equipment side (in this case, referred to as a second regulation member 26B as a first modified example) is composed of a shaft member 47 supported by one rising upper wall 18 of the work equipment supporting part 13, and an acceptance body 48 fixed to the column 10b of the work equipment side at the cap rear side. The shaft member 47 is configured by a bolt member composed of a shaft portion 47a and a head portion 47b and it is engaged into a screw hole 49 of the rising wall 18 from the work equipment side by a screw, and the shaft portion 47a is projected to the column's 10b side. The acceptance body 48 is made of a shape having a L-shaped section having a horizontal wall 48a and a vertical wall 48b, and the end face 54 of the acceptance body 48 is coupled with the column 10b by a bonding means such as welding. Then, under the condition that the vibration and the shock from the frame 1 is accepted in the above-described four attenuation mechanisms 25 and the vibration and the shock are not generated from the frame 1, a projection part 50 of the shaft portion 47a projecting from the rising wall 18 is located upward from the horizontal wall 48a of the acceptance body 48, and at the same time, it is located forward from the vertical wall 48b. In other words, also in this case, under the normal condition, the acceptance body 48 as the cab side member is set to be in a non-interferential relation with the shaft member 47 as the member at the frame 1's side.

If the cab 2 is displaced in a direction separating from the frame 1, this second regulation member 26B at the work equipment's side may allow the displacement till the horizontal wall 48a of the acceptance body 48 abuts against the projection part 50 of the shaft portion 47a projecting from the rising wall 18. Therefore, also in this case, the second regulation member 26B may regulate the displacement so that it does not exceed the stroke end (the threshold of the elastic body 30 and the coil spring 32) in the extensional direction of the attenuation mechanism 25. In other words, just before the displacement exceeds the stroke end of the attenuation mechanism 25, the horizontal wall 48a of the acceptance body 48 is set so as to abut against the projection part 50 of the shaft portion 47a. When the cab 2 receives the load from the rear side, the second regulation member 26B can regulate the rotation of the cab 2 by abutting horizontal wall 48a of the acceptance body 48 against the projection part 50 of the shaft portion 47a.

By the way, this second regulation member 26B at the work equipment's side is configured as shown in FIG. 6 and FIG. 7 because the base 17 of the work equipment supporting part 13 is located downward in this mounted location and it is difficult to mount the first regulation member 26A as shown in FIG. 1. Thus, if the above-described first regulation member 26A can be mounted at this location, the first regulation member 26A may be used without using this second regulation member 26B.

Thus, in this cab supporting structure, since the attenuation mechanisms 25 elastically support the cab 2 against the frame 1, it is possible to absorb the vibration and the shock against the cab 2. In this case, under the normal condition, since regulation members 26A and 26B are in non-interferential relation with the attenuation mechanisms 25, the regulation members 26A and 26B may not regulate the displacement and they have no influence on the operational condition of the attenuation mechanism 25. Therefore, under the normal condition, the attenuation mechanism 25 can absorb the vibration and the shock on the cab 2, so that the ride quality is kept in a good condition.

However, if the high impact force (the ROPS load or the like) acts on the cab 2 and the certain displacement is generated when the construction machine falls down, or the construction machine crashes into a rock and a tree or the like, the regulation members 26A and 26B can regulate that displacement and it is possible to prevent the accident such as cab damage by improving the cab rigidity. Just before reaching to the stroke end in the extensional direction of the attenuation mechanism 25, the regulation members 26A and 26B can regulate that displacement. Thus, the damage of the attenuation mechanism 25 can be surely avoided so as to improve endurance of the attenuation mechanism 25. In other words, since the excess load such as the ROPS load having the attenuation mechanism 25 damaged does not act on the attenuation mechanism 25, the cab supporting structure becomes excellent in its endurance and it is possible to obtain the cab 2 having the high ride quality for a long time. Then, since the regulation members 26A and 26B are separately provided other than the attenuation mechanism 25 in this cab supporting structure, the attenuation mechanism 25 is commonly used in the controlled vehicle and the regulation member 26 may be newly added to the cab supporting structure. Therefore, even the ROPS specified vehicle is not required to use a expensive and special attenuation mechanism in order to improve the cab rigidity, so that it is possible to provide the ROPS specified vehicle at a low cost. By the way, according to the above-described embodiment, since the operator can monitor the front part of the structure, the ROPS load at the front side can be avoided to some extent, however, the operator hardly monitors the rear side and the excess load such as the ROPS load may act at the rear side in many cases. Accordingly, like the present embodiment, by providing the regulation members 26A and 26B at the rear side of the cab, its function can be effectively exerted. If the regulation members 26A and 26b are provided at the rear side of the cab, the cab protection function can be effectively exerted and the regulation member 26 at the front side of the cab can be omitted. If the regulation member 26 is omitted, it is possible to reduce the manufacturing cost of the structure. According to the present embodiment, since the columns 10a and 10b are made thicker at the rear side so as to increase the rigidity, this involves an advantage that the regulation members 26A and 26B can be easily attached at the rear side of the cab.

By the way, the regulation member 26 (26A) may be provided in the vicinity of the attenuation mechanism 25 at the front side of the opposite side of the work equipment. In other words, the regulation members 26 may be provided at the opposite side of the work equipment. That is why, if the work equipment is arranged on the work equipment supporting part 13 in this way, the excess load easily acts in a direction that the cab 2 inclines, namely, in an arrowed direction in FIG. 3. In other words, when the work equipment is arranged on the frame 1, the work equipment functions to the cab 2 as a guard, so that there is less of a chance that the excess load such as the ROPS load acts on the cab 2 from the work equipment. On the contrary, this decreases the opportunities that the excess load such as the ROPS load may act on the cab 2 from the work equipment side. On the contrary, there are more opportunities that the excess load such as the ROPS load may act at the opposite side of the work equipment than the above-described opportunities. Therefore, if the regulation members 26 are provided at the opposite side of the work equipment, its function may be effectively exerted and the second regulation member 26B at the rear side of the work equipment's side can be omitted, and this make it possible to reduce the manufacturing cost of the structure.

Figure 8:
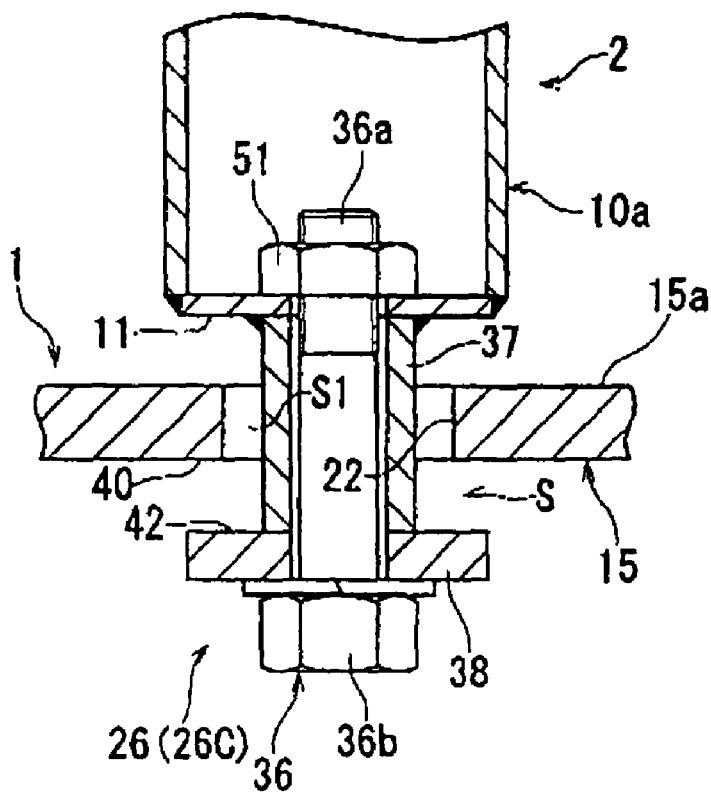
FIG. 8 is a sectional view of a second modified example of the regulation member of the above-described cab support structure.

Next, FIG. 8 shows a regulation member 26C as a second modified example. In this case, this regulation member 26C is supported by the column 10a. In other words, the upper end of the tubular spacer 37 is fixed on the bottom wall 11 of the column 10a by the bonding means such as welding, and the shaft portion 36a of the shaft member 36 is attached to a nut member 51 engaged into the inside of the bottom wall 11 of the column 10a by a screw. Also in this case, the spacer 37 is set to be smaller than the hole diameter of the through-bore 22 of the upper wall 15a and the spacer 37 is freely fitted into this through-bore 22. Accordingly, also in this case, the gap S is formed between the upper face 42 of the stopper 38 and the lower face 40 of the upper wall 15 and at the same time, the gap S1 is formed between the outer circumferential face of the spacer 37 and the inner circumferential face of the through-bore 22 of the upper wall 15a.

Figure 9:
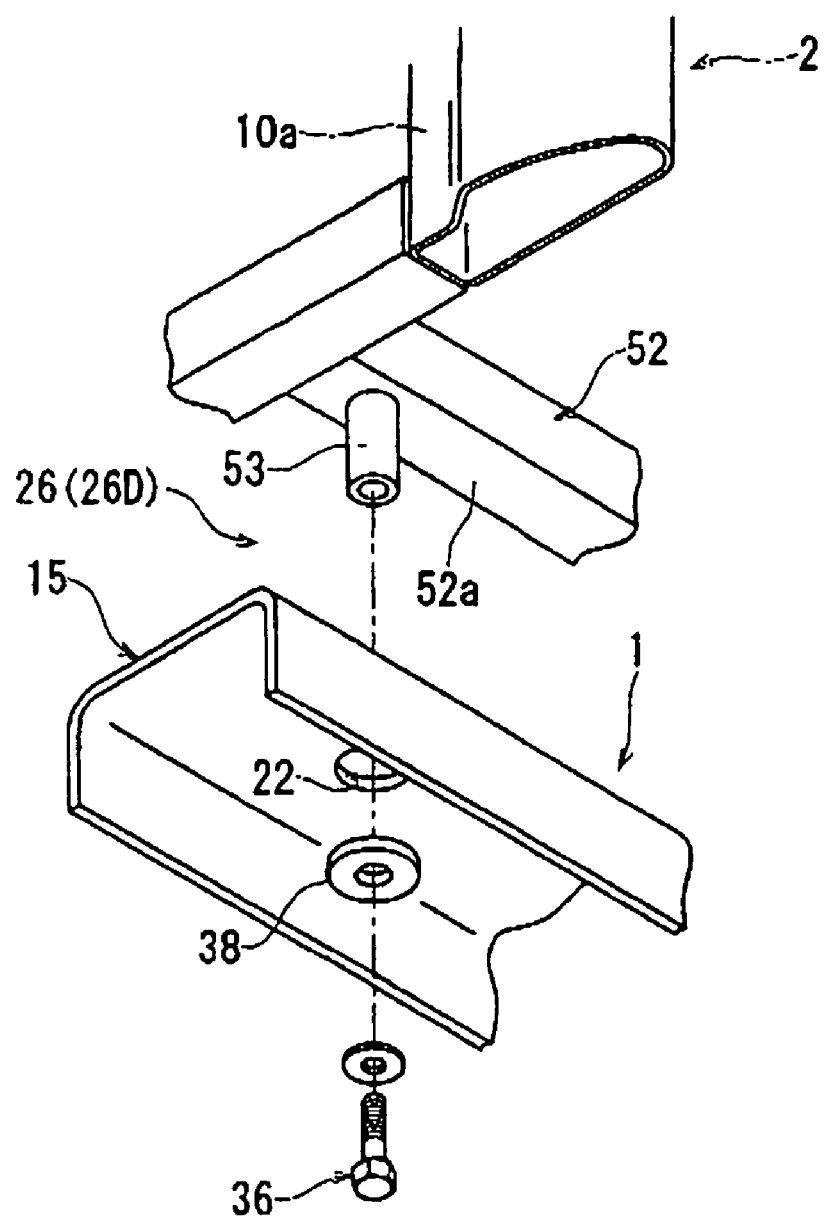
FIG. 9 is an exploded perspective view of a third modified example of the regulation member of the above-described cab support structure.
Figure 10:
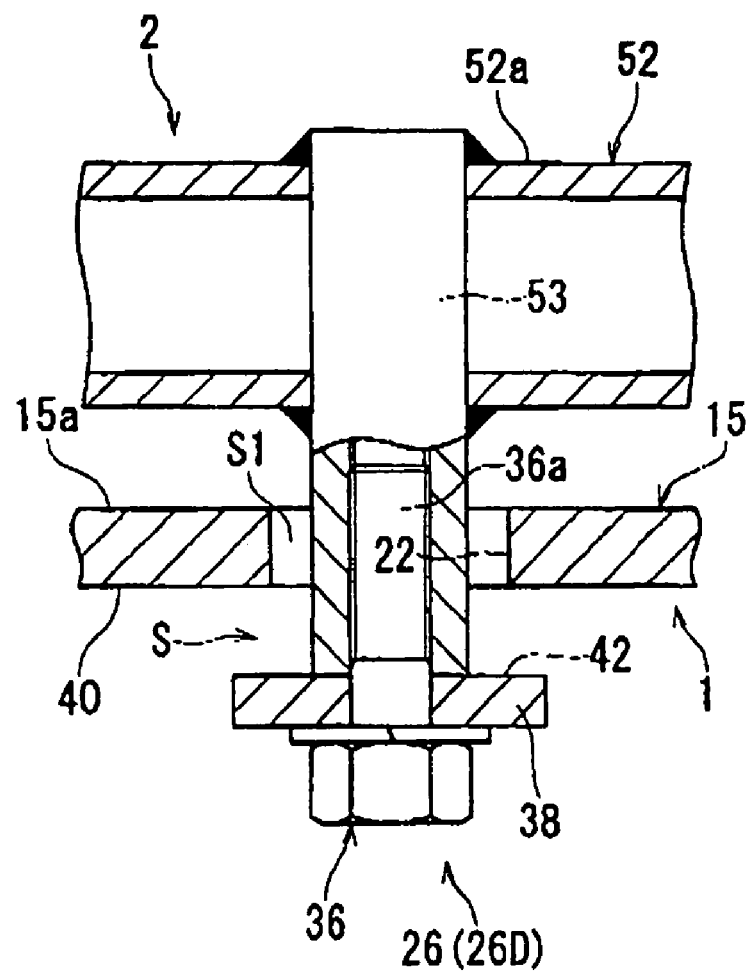
FIG. 10 is a sectional view of a third modified example of the regulation member of the above-described cab support structure.

When the cab 2 has a lower frame body 52 as shown in FIG. 9, as shown in FIG. 9, a regulation member 26D showing a third modified example may be annexed to a lateral directional bar 52a of this lower frame body 52. In this case, as shown in FIG. 10, a rod 53 is fixed on the lateral directional bar 52a by a bonding means such as welding, the shaft portion 36a of the shaft member 36 is engaged into this rod 53 by a screw, and the stopper 38 is mounted on the rod 53. Also in this case, the outer diameter of this rod 53 is set to be smaller than the diameter of the through-bore 22 of the upper wall 15a, the gap S is formed between the upper face 42 of the stopper 38 and the lower face 40 of the upper wall 15a, and the gap S1 is formed between the outer circumferential face of the road 53 and the inner circumferential face of the through-bore 22.

Accordingly, also in these regulation members 26C and 26D shown in FIG. 8 and FIG. 10, the cab side members (the spacer 37, the shaft member 36, and the rod 53 or the like) are set to be in a non-interferential relation with the frame's 1 side in the normal condition. Thereby, in the normal driving and normal operation of the construction machine, these regulation members 26C and 26D may not regulate the absorption function to absorb the shock due to the attenuation mechanism 25 and the riding quality is not lowered. If the excess load such as the ROPS load acts on the cab 2 and the certain displacement is generated, the upper face 42 of the stopper 38 abuts against the lower face 40 of he upper wall 15a so as to regulate that displacement and it is possible to prevent the accident such as cab damage by improving the cab rigidity. Since the regulation member 26 is supported by the column 10a in FIG. 8, it is possible to improve the supporting rigidity of the cab 2 due to the regulation member 26. Thereby, if the excess shock load such as the ROPS load acts on the cab 2, it is possible to prevent the accident such as cab damage more certainly. In FIG. 8 and FIG. 10 or the like, the acceptance plate 41 used in FIG. 1 is not used, however, the acceptance plate 41 may be used also in FIG. 8 or the like, and on the contrary, in FIG. 1, the acceptance plate 41 may not be used in FIG. 1.

Figure 11:
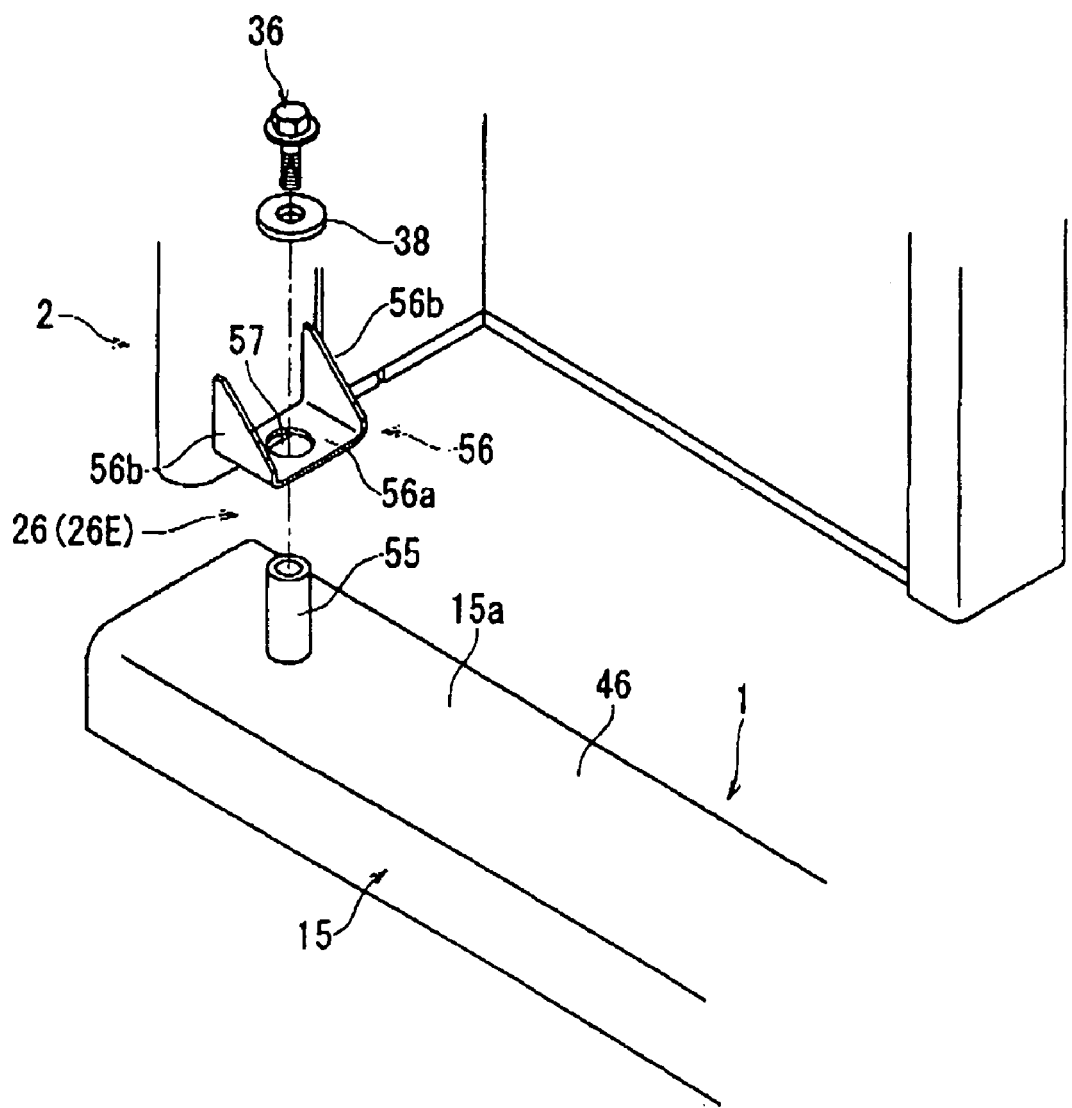
FIG. 11 is an exploded perspective view of a fourth modified example of the regulation member of the above-described cab support structure.
Figure 12:
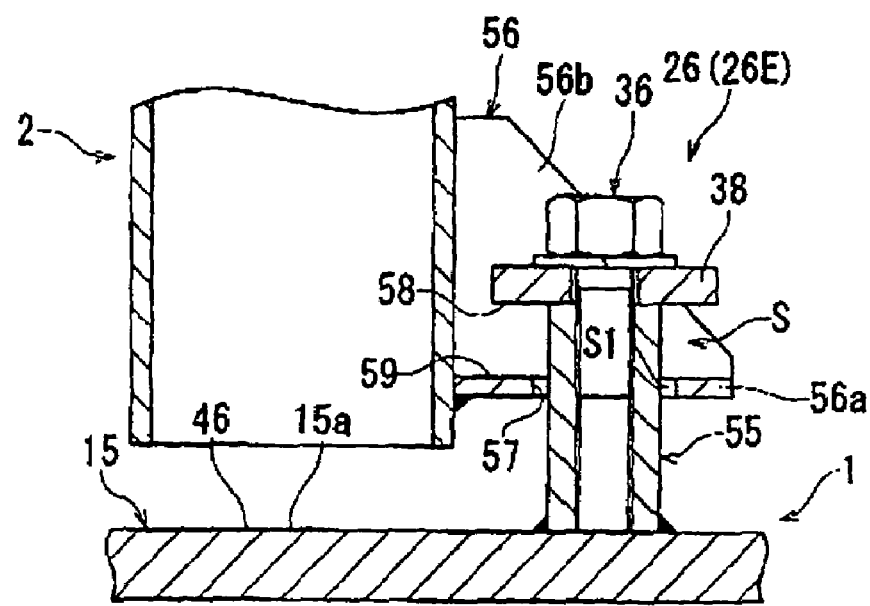
FIG. 12 is a sectional view of a fourth modified example of the regulation member of the above-described cab support structure.

Next, a regulation member 26E as a fourth modified example shown in FIG. 11 and FIG. 12 is provided with a rod 55 constructed from the upper face 46 of the upper wall 15a of the frame 1, the shaft member 36 engaged into the rod 55 by a screw from upward thereof with clipping the stopper 38, and an acceptance plate 56 annexed to the cab's 2 side. In other words, the acceptance element 56 is composed of a bottom wall part 56a, and triangle rising wall parts 56b constructed from the opposite ends of this bottom wall part 56a, and the bottom wall part 56a is provided with a through-bore 57. In this case, the outer diameter of the rod 55 is set to be smaller than the diameter of the through-bore 57, and the rod 55 is freely inserted into the through-bore 57.

Then, under the condition that the vibration and the shock are not generated from the frame 1, the gap S is formed between a lower face 58 of the stopper 38 and an upper face 59 of the acceptance element 56, and the gap S is formed between the outer circumferential face of the rod 55 and the inner circumferential face of the through-bore 57 of the bottom wall part 56a of the acceptance element 56. Accordingly, also in these regulation member 26E shown in FIG. 11 and FIG. 12, the cab side member (the acceptance element 56 or the like) is set to be in a non-interferential relation with the member at the frame's 1 side (the rod 55 or the like) in the normal condition. Thereby, in the normal driving and normal operation of the construction machine, this regulation member 26E may not regulate the absorption function to absorb the shock due to the supporting pair 25. If the excess load such as the ROPS load acts on the cab 2 and the certain displacement is generated, the upper face 59 of the bottom wall part 56a of the acceptance element 56 abuts against the lower face 58 of the stopper 38 so as to regulate that displacement and it is possible to prevent the accident such as cab damage by improving the cab rigidity.

Figure 13:
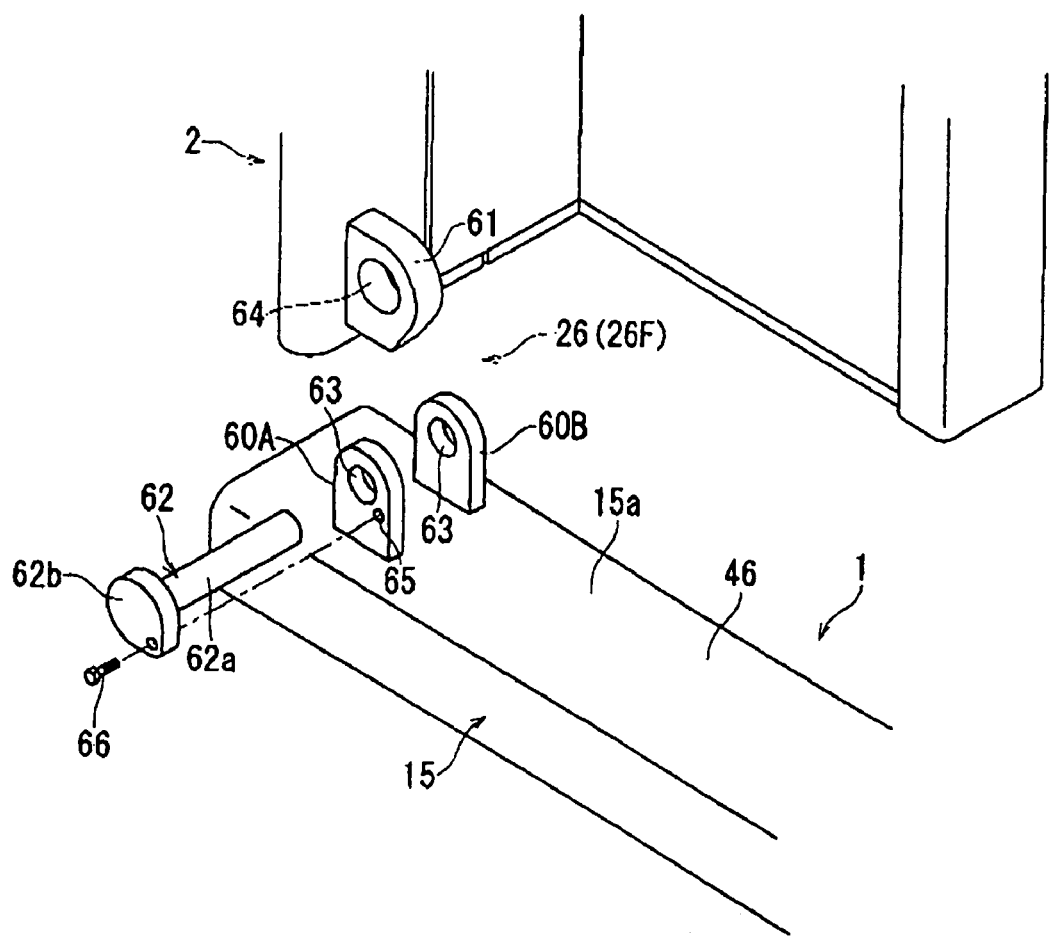
FIG. 13 is an exploded perspective view of a fifth modified example of the regulation member of the above-described cab support structure.
Figure 14:
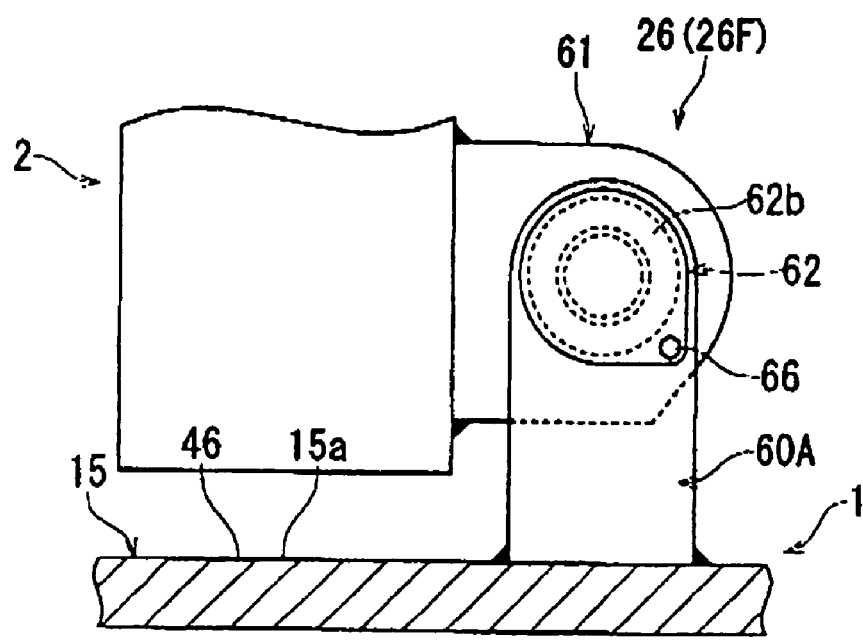
FIG. 14 is a side view of a fifth modified example of the regulation member of the above-described cab support structure.
Figure 15:
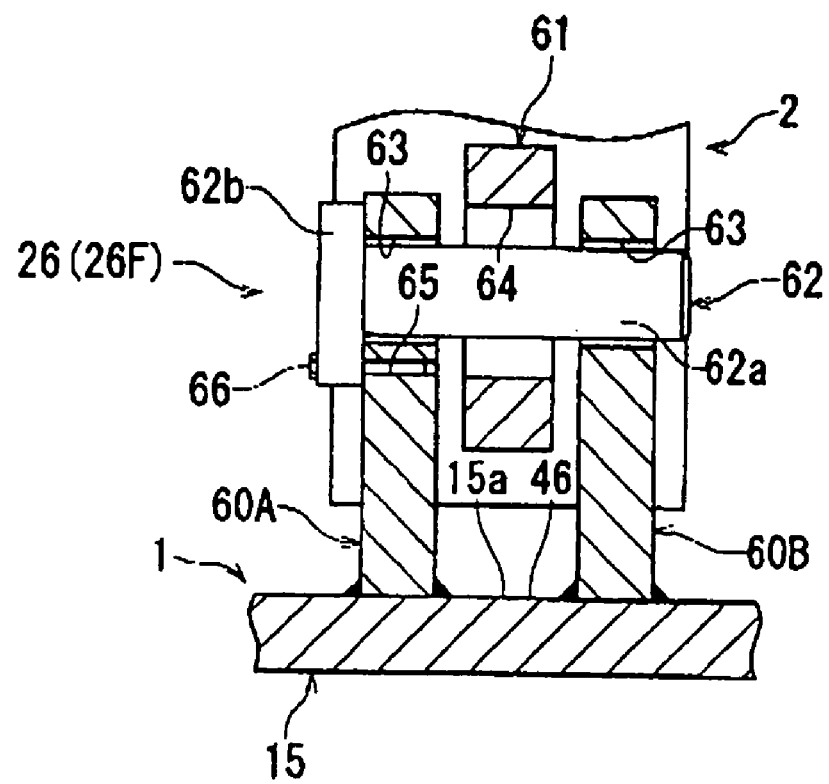
FIG. 15 is a sectional view of the fifth modified example of the regulation member of the above-described cab support structure.

A regulation member 26F as a fifth modified example shown in from FIG. 13 to FIG. 15 is provided with a pair of supporting elements 60A and 60B constructed from the upper face 46 of the upper wall 15a of the frame 1, a block body 61 lying between these supporting elements 60A and 60B, and a shaft member 62 inserted into the supporting elements 60A and 60B with the block body 61 lying between these supporting elements 60A and 60B. In other words, the block body 61 is fixed to the cab 2's side, and a through-bore 64 is formed, into which a shaft part 62a of a shaft member 62 is inserted. The hole diameter of the through-bore 64 is set to be larger than the outer diameter of the shaft part 62a of the shaft member 62 and the shaft part 62a of the shaft member 62 are freely inserted into this through-bore 64. In addition, also on the supporting elements 60A and 60B, through-bores 63 are formed, into which the shaft part 62a of the shaft member 62 is inserted. The diameter of this through-bore 63 is slightly larger than the outer diameter of the shaft part 62a of the shaft member 62. The shaft member 62 is composed of the above-described shaft part 62a and a head portion 62b, and as shown in FIG. 15, under the condition that the shaft part 62a is inserted into the through-bore 63 of one supporting element 60A, the through-bore 64 of the block body 61, and the through-bore 63 of the other supporting element 60B, the shaft part 62a is locked. In other words, providing a screw hole 65 on one supporting element 60A, a bolt member 66 is engaged into this screw hole 65 by a screw through the through-bore formed on the head portion 62a of the shaft part 62.

Thereby, also in a regulation member 26F shown in from FIG. 13 to FIG. 15, the cab side member (the block body 61 or the like) is set to be in a non-interferential relation with the frame's 1 side in the normal condition. Thereby, in the normal driving and normal operation of the construction machine, this regulation member 26F may not regulate the absorption function to absorb the shock due to the supporting pair 25. If the excess load such as the ROPS load acts on the cab 2 and the certain displacement is generated, the inner circumferential edge of the through-bore 64 of the block body 61 abuts against the head portion 62a of the shaft part 62 so as to regulate that displacement and it is possible to prevent the accident such as cab damage by improving the cab rigidity.

Figure 16:
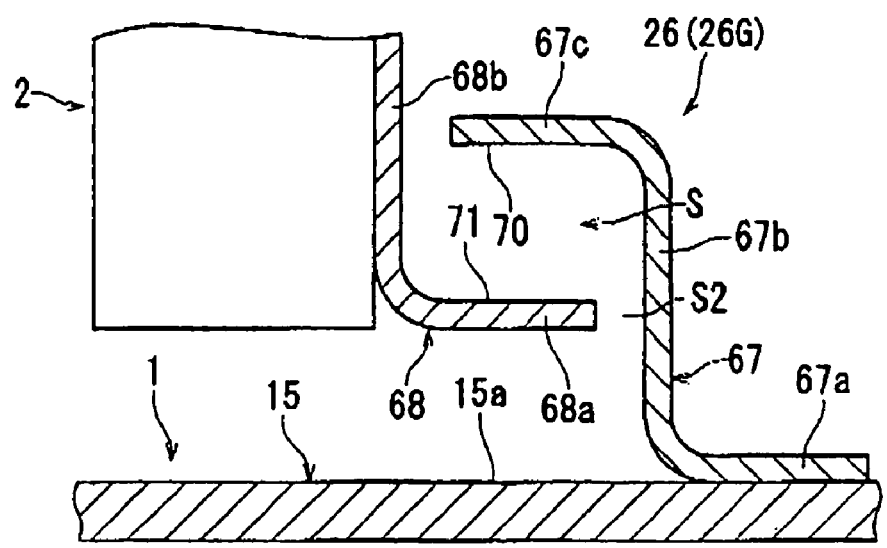
FIG. 16 is a sixth modified example of the regulation member of the above-described cab support structure, specifically.
Figure 16:
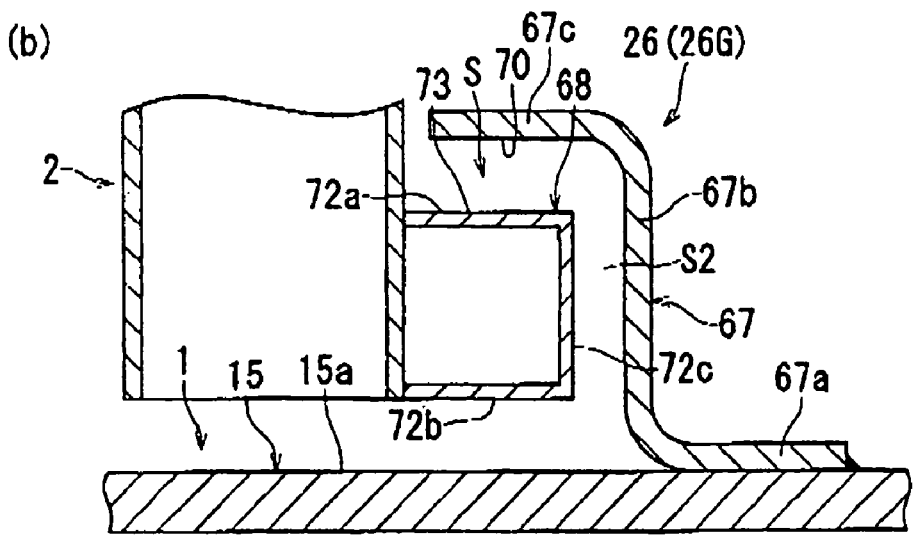
Figure 17:
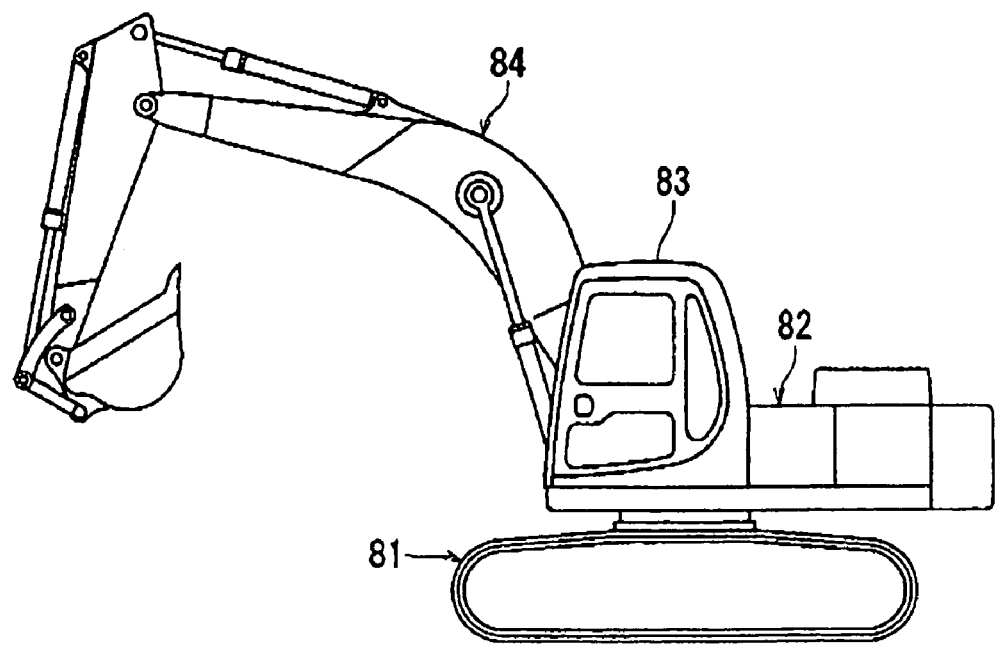
FIG. 17 is a simple view of a construction machine.
Figure 18:
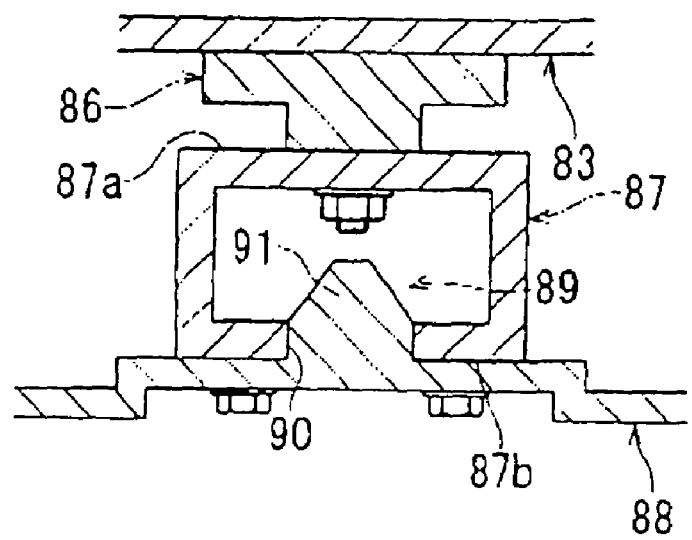
FIG. 18 is a substantial part sectional view of a conventional cab supporting structure.
Figure 19:
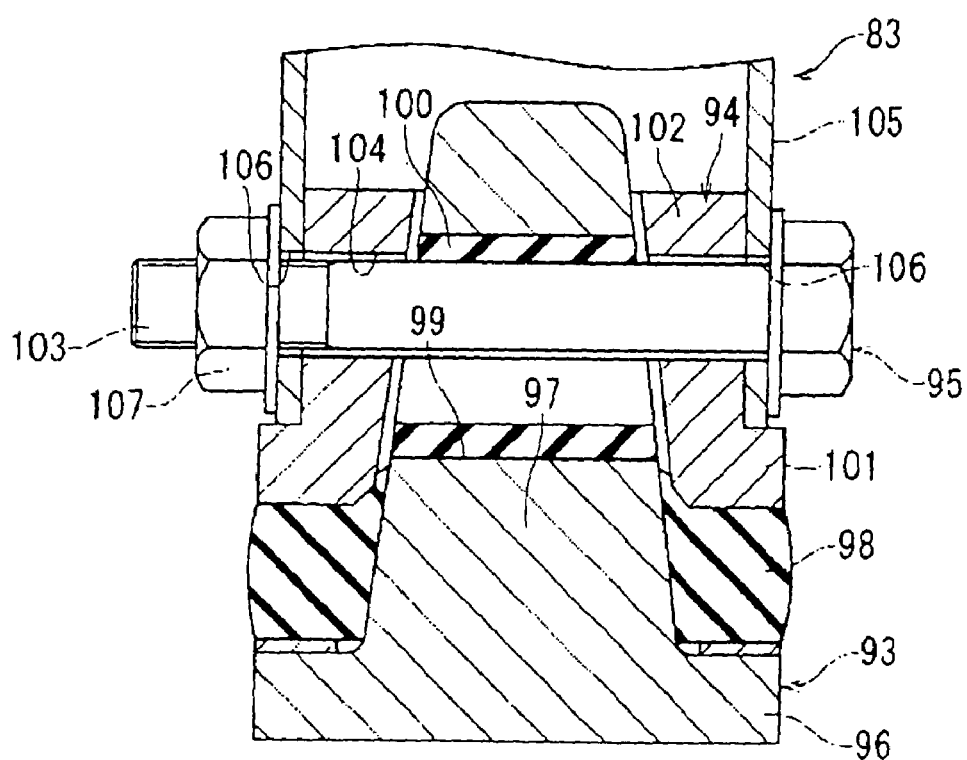
FIG. 19 is a substantial part sectional view of a conventional other cab supporting structure.
Figure 20:
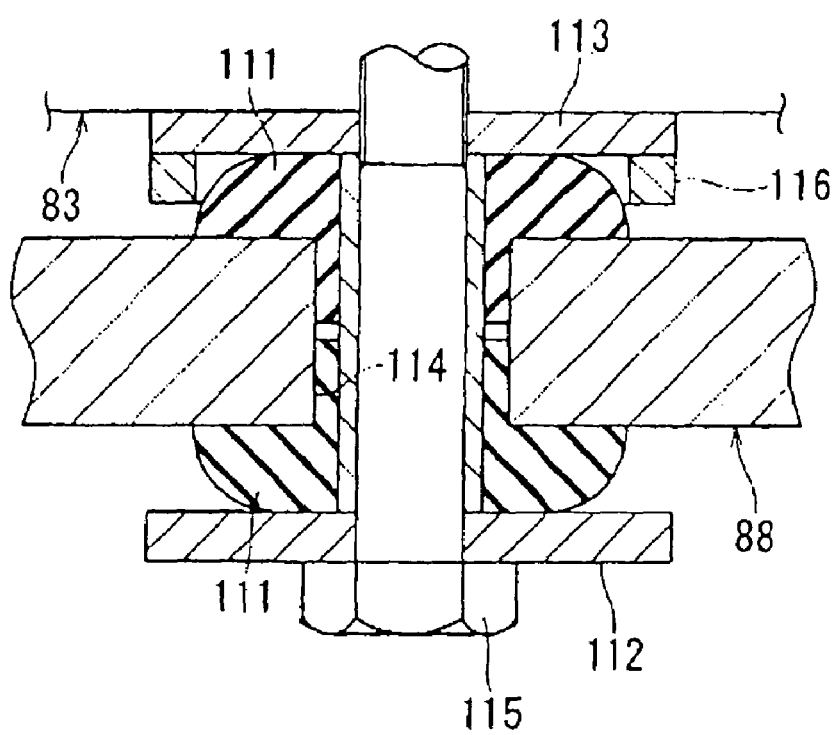
FIG. 20 is a substantial part sectional view of the conventional further other cab supporting structure.
Figure 21:
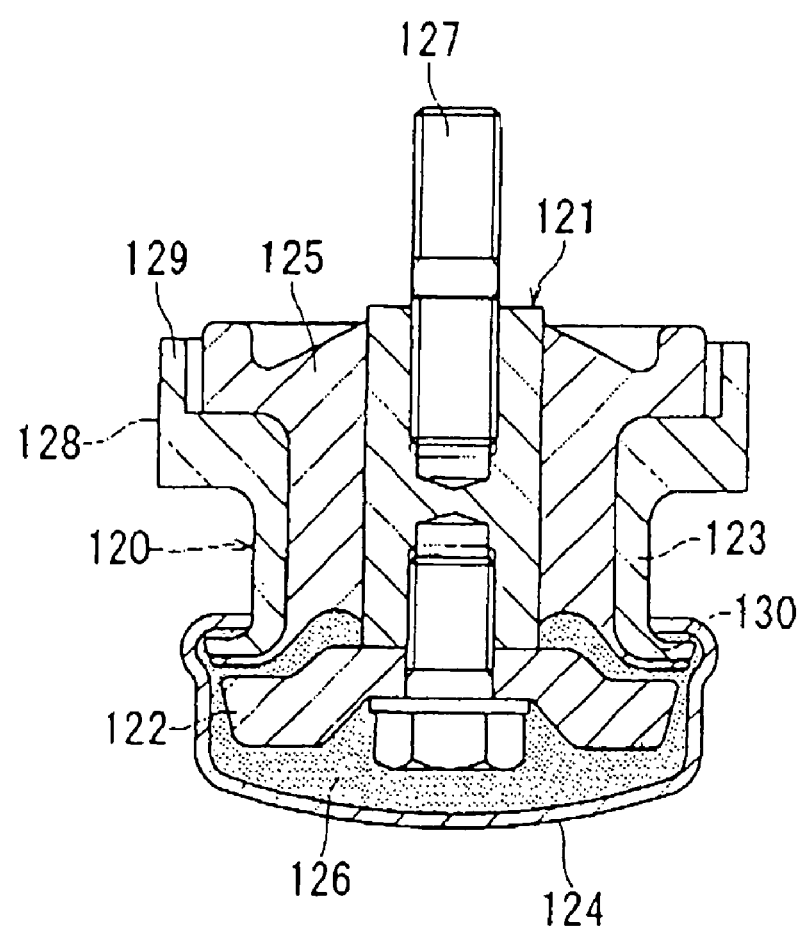
FIG. 21 is a substantial part sectional view of the conventional still further other cab supporting structure.

A regulation member 26G as a sixth modified example shown in FIG. 16(*a*) is provided with an acceptance element 67 constructed from the upper face 46 of the upper wall 15a of the frame 1, and a supporting body 68 at the cab's 2 side. The acceptance element 67 is composed of a lower element part 67a attached on the upper face 46 of the upper wall 15a, a rising upper element part 67b extending vertically from this lower element part 67a, and an upper element part 67c extending horizontally from the upper end of this rising upper element part 67b. In the event of attaching the lower element part 67a on the upper face 46 of the upper wall 15a, the bolt and nut coupling or the welding may be available. The supporting body 68 is configured by a section bar having a L-shaped section composed of a horizontal wall 68a and a vertical wall 68b, and under the condition that the vibration and the shock are not generated from the frame 1, the gap S is formed between a lower face 70 of the upper element part 67c of the acceptance element 67 and an upper face 71 of the horizontal wall 68a of the supporting body 68. Under the condition that this gap S is formed, the gap S2 is formed between the inside of the rising upper element part 67b of the acceptance element 67 and the front end edge of the vertical wall 68b of the supporting body 68.

Thereby, also in a regulation member 26G shown in FIG. 16(*a*), the cab side member (the supporting body 68 or the like) is set to be in a non-interferential relation with the member at the frame 1's side (the acceptance element 67 or the like) in the normal condition. Thereby, in the normal driving and normal operation of the construction machine, this regulation member 26G may not regulate the absorption function to absorb the shock due to the supporting pair 25. If the excess load such as the ROPS load acts on the cab 2 and the certain displacement is generated, the upper face 71 of the horizontal wall 68a of the supporting body 68 abuts against the lower face 70 of the upper element part 67c of the acceptance element 67 so as to regulate that displacement and it is possible to prevent the accident such as cab damage by improving the cab rigidity. As shown in FIG. 16(*b*), the supporting body 68 may be configured by a section bar having a horse-shoe shaped section composed of an upper wall 72a, a lower wall 72b, and a coupled wall 72c coupling the upper wall 72a with the lower wall 72b. Also in this case, the gap S is formed between the lower face 70 of the upper element part 67c of the acceptance element 67 and the upper face 73 of the upper wall 72a of the supporting body 68, and at the same time, the gap S2 is formed between the rising upper element part 67b of the acceptance element 67 and the coupled wall 72c of the supporting body 68.

The specific embodiments of the present invention are described as above, however, the present invention is not limited to the above-described embodiments and the present invention can be variously modified and effected within the range of the sprit of the present invention. For example, the regulation member 26 is disposed may be provided at all of the four corners of the floor frame 3 of the cab 2, or may be provided at a location other than the four corners, and the number of the regulation members 26 may be four and more. The attenuation mechanism 25 is not limited to the illustrated one and various liquid sealing type mount and a non-liquid sealing type mounted or the like may be available. Since it is preferable for the regulation member 26 to regulate the displacement of the cab 2 before the stroke end of the attenuation mechanism 25, in accordance with the stroke end of the attenuation mechanism 25 (mount) to be used, the regulation member 26 can arbitrarily change the displacement amount to be regulated, however, if the protection function protecting the cab 2 from the high shock can be exerted, the regulation member 26 may regulate the displacement over the stroke end of the attenuation mechanism 25. This cab supporting structure may be used for various construction machines such as a wheel loader and a bulldozer or the like in addition to the hydraulic shovel, and for various agricultural machines requiring the cab supporting structure. It is preferable for this cap supporting structure to be used for the cab corresponding to ROPS, however, it may be used for a cab of a controlled vehicle without corresponding to ROPS.

What is claimed is:

1. A cab supporting structure comprising:

an attenuation mechanism disposed between a frame and a cab for elastically supporting the cab against the frame in a direction in which the cab is approaching the frame and in a direction in which the cab is separating from the frame; and a regulation member for regulating the cab's displacement when the cab is displaced in a direction separating from the frame so that the displacement does not exceed a predetermined amount, wherein said regulation member regulates the displacement of the cab so that the displacement is limited to a stroke end of the attenuation mechanism in the direction in which the cab is separating from the frame, wherein said regulation member includes first and a second regulation members each provided on a rear end of the cab, the first regulation member being on a side away from a work equipment which is mounted on the frame, and the second regulation member being on a side close to the work equipment, and wherein the first and the second regulation members have different structures.

2. The cab supporting structure according to claim 1, wherein said first regulation member is disposed between a bottom side of the cab and an upper face of the frame.

3. The cab supporting structure according to claim 1, wherein said second regulation member is disposed between a side face of the cab and a side face of the frame.

4. The cab supporting structure according to claim 3, wherein said second regulation member is composed of a shaft member fixed to protrude from the frame and an acceptance body fixed to the cab side and abuts against an end of the shaft member which regulates the cab's displacement.

5. The cab supporting structure according to claim 4, wherein said acceptance body has a horizontal wall and a vertical wall.

* * * * *